Figure 1:
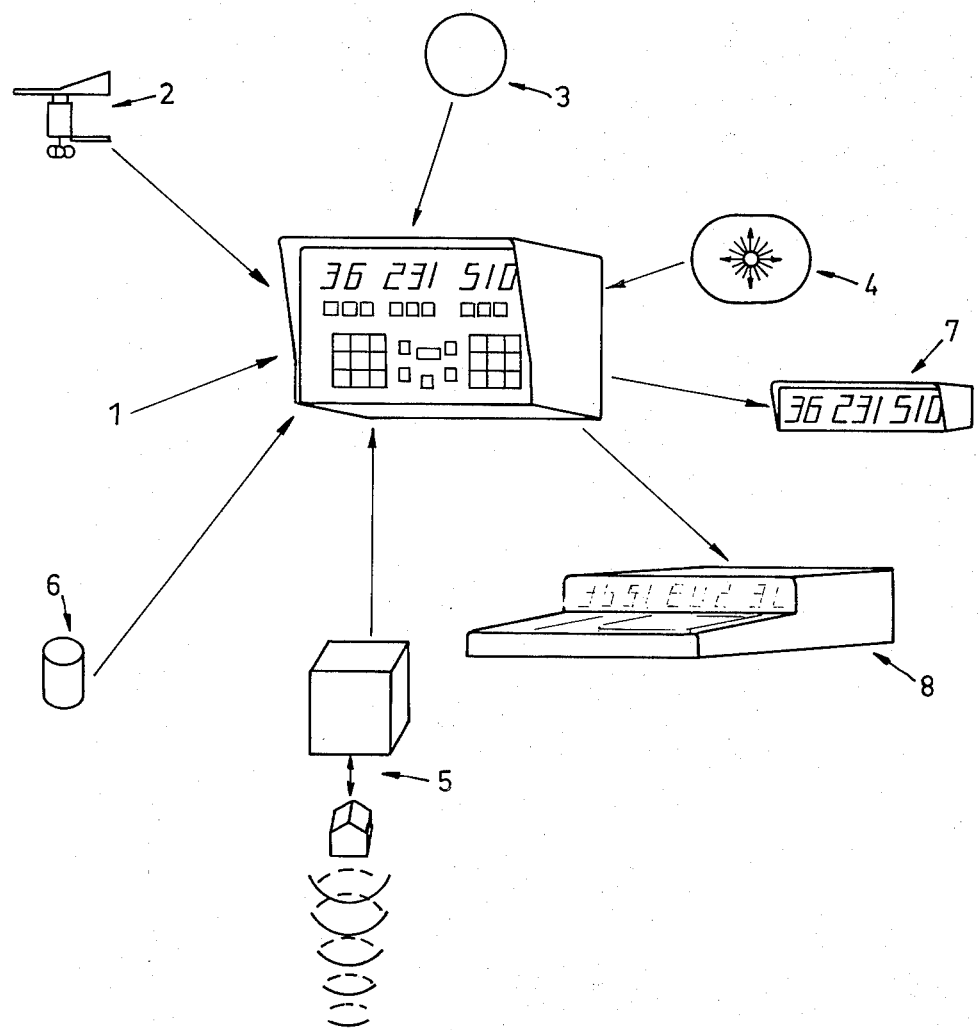

United States Patent [19]
Sem-Sandberg

[11] 3,924,465
[45] Dec. 9, 1975

[54] SHIP NAVIGATION EQUIPMENT
[76] Inventor: Sverre George Sem-Sandberg, Mariebergsvagen 21, S-136 68 Handen, Sweden
[22] Filed: Apr. 4, 1974
[21] Appl. No.: 458,009

[30] Foreign Application Priority Data
Apr. 16, 1973 Sweden .............................. 7305363
Apr. 16, 1973 Sweden .............................. 7305365

[52] U.S. Cl. ................................................ 73/181
[51] Int. Cl.² ........................................ G01C 21/10
[58] Field of Search .......... 73/178 R, 181, 182, 183, 73/184, 185, 186, 187; 340/213 Q

[56] References Cited
UNITED STATES PATENTS
1,083,597  1/1914  Cummings ............................. 73/185
3,362,220  1/1968  Donoho ................................. 73/181
3,636,537  1/1972  Terry ................................... 340/182

Primary Examiner—Donald O. Woodiel
Attorney, Agent, or Firm—O'Brien & Marks

[57] ABSTRACT

A method and apparatus for ship navigation information display system is disclosed including continuous sensing of at least two of the following parameters: the ship's speed relative to the water, compass course, wind direction and speed and similar magnitudes of importance for sailing the ship. Signals corresponding to the measured parameters and a signal calculated from the speed signal and corresponding to the total distance travel, are converted into digital form and are fed into a number of temporary stores and selector circuits, from which dependent on the setting of manually operated switches, at least one of these signals for conversion to a signal suitable for display on a digital display, the conversion taking place digit by digit utilizing a time multiplex procedure under the control of a common display control circuit.

7 Claims, 10 Drawing Figures

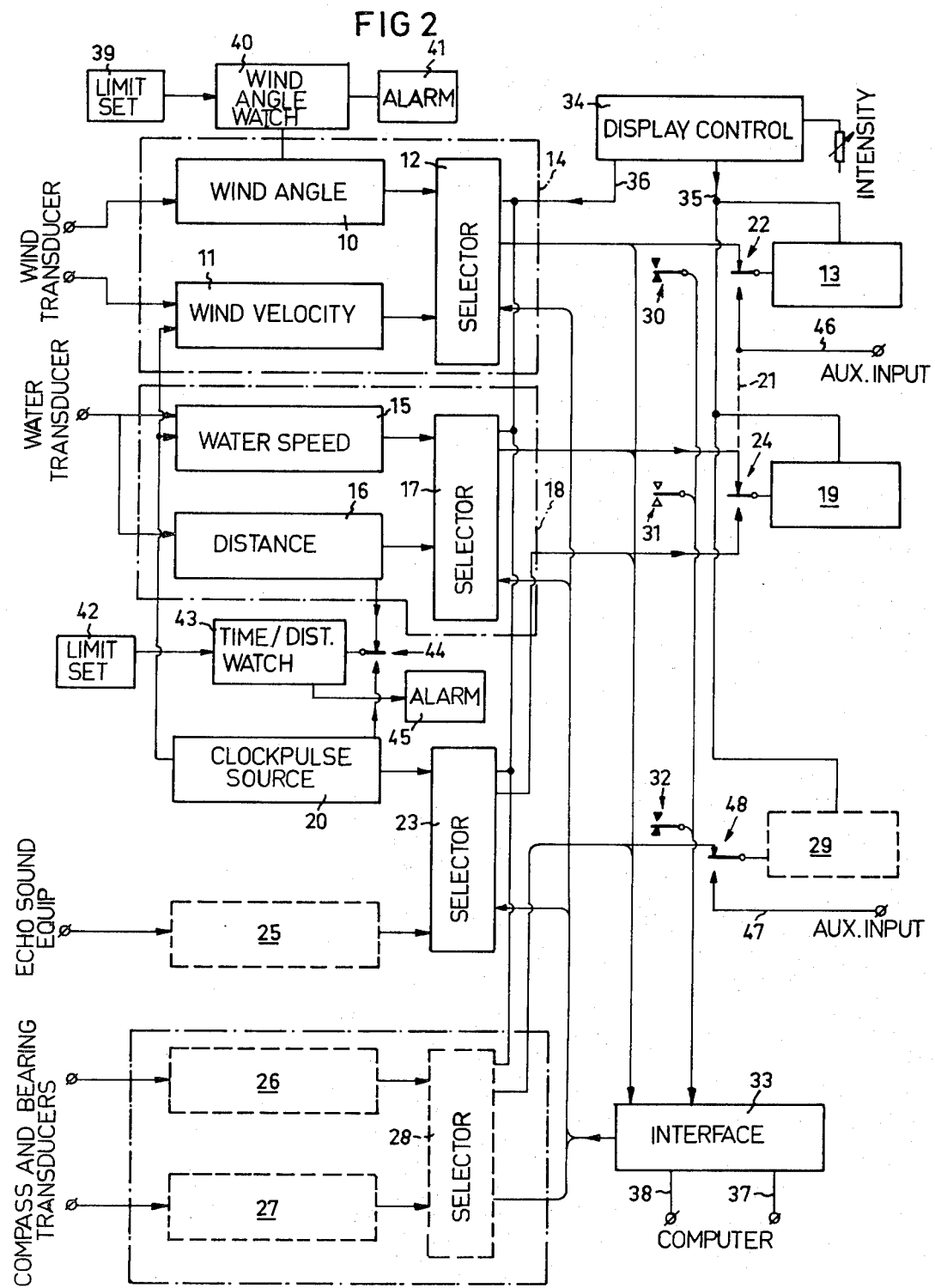

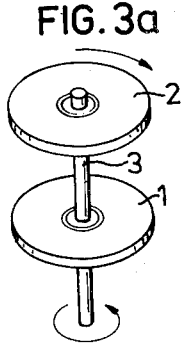
FIG. 3a
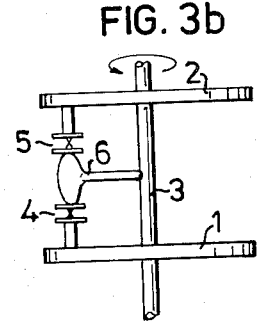
FIG. 3b
FIG. 8
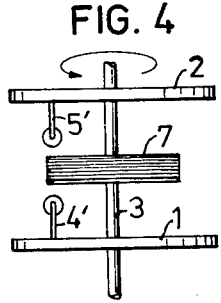
FIG. 4
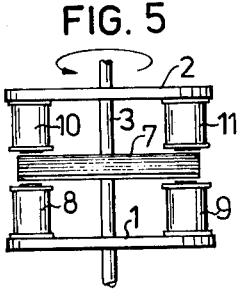
FIG. 5
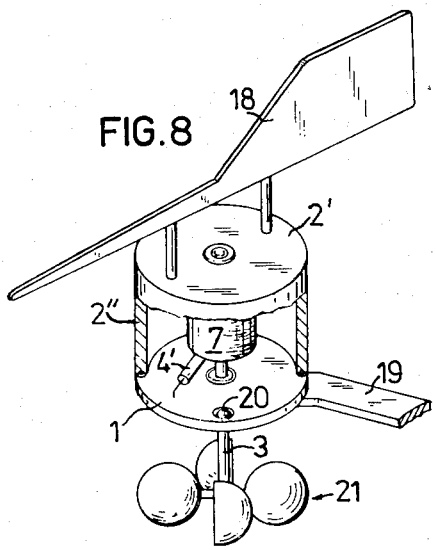
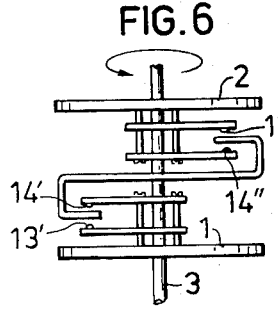
FIG. 6
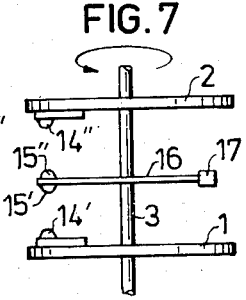
FIG. 7
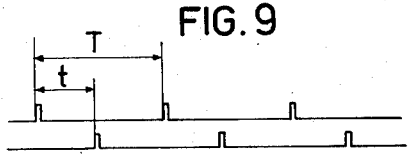
FIG. 9

SHIP NAVIGATION EQUIPMENT

The present invention relates to a method for ship navigation, in which continuous sensing takes place of two or more of the following parameters: ship speed relative to the water, compass course, wind direction, wind speed and similar parameters of importance in sailing the ship. The invention also relates to a system carrying out the method, and to revolution and angular measurement apparatus for measuring wind speed and wind direction intended for use with the system.

The navigational aids of today for pleasure boars and for smaller working ships, include devices such as a compass, and speed and distance logs. These are often supplemented by instruments for the optimal sailing of the ship under existing conditions, such as the wind direction indicator and wind speed meter for sailing boats. In motor driven vessels there are as a rule motor revolution counters for a similar purpose. This equipment usually consists of indicating instruments and in marine applications these are characterized by having a construction which gives bad resolution leading to poor accuracy. Instruments of this type are also generally difficult to read because of the large differences in the extreme values which they show. For example, if the instrument gives an indication over a large linear scale, it is only with difficulty that small variations can be read off. To obviate this difficulty it is often necessary to further include instruments to give differences in speed and special wind angles. This means that aside from just the compass one generally needs a large collection of instruments for the presentation of the results of relatively simple measurements. As mentioned, instruments of this type are generally difficult to read, and especially in sailing vessels one is compelled by the reason of space available to place the instruments far away from the helmsman reading the instruments, thus causing the helmsman/skipper to be unable to give his full attention to sailing the vessel. In difficult conditions this can be dangerous as well as inconvenient.

The object of the invention is to facilitate navigation by overcoming the weaknesses just mentioned. The equipment is therefore compact to allow simple mounting adjacent to the helmsman, either on the bulkhead in front of or at the binnacle. Instead of the previously used indicating instruments, the invention provides information as to speed, course, distance, wind conditions, etc., presented in the form of easily read numerical displays. Since the helmsman has the equipment in his immediate vicinity, the presentation of more than 2 or 3 values (e.g., course, speed and possibly wind angle or engine revolutions) at any one time is not necessary since by a simple hand movement additional information can be presented on the same numerical display as it is required. The invention also makes possible automatic supervision of pre-set critical limiting values. An audible and/or visual alarm is given when the set limiting values are exceeded.

The above object is achieved by converting the signals from the sensors corresponding to the parameters to be measured into digital form and feeding them into a number of temporary storage and selector circuits. The selector circuits, in accordance with the setting of manually actuated switches, select at least one of these signals for conversion to a signal suitable for presentation on a numerical display, and this conversion taking place digit by digit utilizing a time multiplex technique controlled by a common presentation control circuit.

If the selector circuits select several signals for presentation, which by using a time multiplex technique are converted by a common converter to signals suitable for numerical presentation, the simultaneous reading-off display of several different measured parameters can take place.

The connection of a mini computer for accumulating information and navigation calculations is made very simple, if the signals in digital time multiplex form can also be fed to a computer interface unit which provides one signal identifying the parameter being displayed, and a signal representing the value of this parameter.

The supervision of critical limiting values is made possible by one or more parameters, e.g., wind angle, total travel distance and/or time being continuously monitored and an alarm function initiated when a predetermined value is exceeded, this monitoring being accomplished by the signal representing the monitored parameter being compared in a signal level comparison circuit with a set value signal provided from a manually adjustable setting device.

As mentioned, the invention also relates to equipment for carrying out the above-defined method, the equipment being provided with transducers to measure at least wind direction, wind speed and vessel speed, and with input circuits connected to the transducers and adapted to provide digital signal outputs corresponding to the transducer output. A first selector circuit receives signals corresponding to wind direction and wind speed, and a second selector circuit receives signals corresponding to ship speed and travelled distance from the input circuits, at least two manual switches, each connected to a selector circuit control and a common code converter using time division multiplex control the selector circuits for converting the signals at the outputs of the selector circuits to a form suitable for decimel numerical display to either two numerical displays which display the outputs from the first and the second selector circuit respectively or only one numerical display which, by a manual switch, can be caused to the ouput of the first or the second selector circuit.

Used with the present system in a revolution and angle measuring apparatus for measuring the number of revolutions and mutual angular displacement of two bodies rotatably independent of each other, and including a shaft on which the bodies are rotatably mounted, electric pulse senders arranged on each body and a means attached to the shaft which, on passing the transducers, actuats these so that each of them gives off its electrical pulse, the frequency of these pulses represents the revolution speed of the bodies, and the mutual time displacement represents the momentary angular relationship of the bodies.

In conformance with the presentation of the various parameters in the present invention in a digital form, sufficient resolution and exactness is obtained over the whole of the measuring range, supplementary instruments thus not being required.

Apart from the advantages mentioned, the invention offers the advantage of easy attachment of supplementary equipment to the basic unit such as an optical bearing disc and radio direction finding equipment enabling the direction finding result to be read off in digital form. Since all information is stored in digital form, this also allows for a simple connection to a general or special computer for navigational purposes. This allows for greater safety at sea because an exact determination of the position of a ship can be made at every moment in time.

Further advantages and distinguishing features of the subject invention will be seen from the description of a preferred embodiment while referring to the attached drawings, of which:

FIG. 1 shows the construction principle of the navigation system according to the subject invention, FIG. 2 shows a block diagram for the electronic circuits constituting the system of FIG. 1, FIGS. 3a and 3b show the construction principle of the revolution and angle measuring apparatus, FIGS. 4–7 show the apparatus of FIG. 3a and 3b provided with different kinds of transducers FIG. 8 shows the apparatus of FIGS. 3a and 3b constructed for use in measuring wind speed and wind direction, and FIG. 9 shows the electrical output signals obtained from the apparatus of FIG. 8.

As stated, previously known equipment for navigational purposes is generally composed of a number of individual indicating instruments, which for ease of reading are often supplemented by a number of repeater instruments. These indicating instruments may, for example, be individual instruments for wind speed, wind direction, speed and speed difference, tacking indicator, course indicator and echo-sounder. As has been mentioned, the speed difference indicator is required to facilitate reading-off of momentary speed by comparing this speed with a previously set speed value. Accurate reading to momentary speed is otherwise difficult to measure due to the large interval which must be covered by the speed indicator.

FIG. 1 shows in principle the navigation system designed according to the invention. The basic component in the system is a cockpit unit 1 provided with numerical displays for the presentation of measuring values and different operating means for selecting the parameters displayed. To this unit there is connected a number of transducers such as a wind meter 2 (for both speed and angle), an indicator 3 for bearing (radio or optical), a digital compass 4, an echo-sounder 5 and a transducer 6 for speed and distance travel. Unit 1 contains different electronic circuits which process the input values to a form suitable for digital presentation and select the parameters which are to be displayed at any given time. Unit 1 can also be connected to a simple repeater instrument 7 and in certain cases to a mini computer 8 as well.

All the measuring values obtained from transducers 2–6 are not shown simultaneously on the numerical display of unit 1 but the ones of interest at any time are selected by the operation of switches on the front panel of the unit. In the present embodiment the system is constructed so that simultaneous presentation of three different measured parameters can take place.

The construction and function of the cockpit unit 1 will now be described while referring to the block diagram shown in FIG. 2.

The output signals obtained from the transducers are fed into individual calculation circuits for processing the signals to a form suitable for digital display. Both signals from the wind meter are thus fed into a wind angle calculation unit 10 and a wind velocity calculation unit 11, respectively. The outputs from both these units 10 and 11 is fed to a selector circuit 12 which selects one of the two input signals for transmission to a display circuit 13 provided with a three digit display. Units 10,11 and the selector circuit 12 together form a wind unit 14.

The output signal obtained from a water transducer is fed to a water speed calculation unit 15 and a distance calculation unit 16. These units, together with a selector circuit 17 connected to them, comprise a water unit 18. The distance unit 16 has the function of calculating the total travelled distance from the water transducer output, while the water speed unit 15 combines the output signal from the water transducer and a clock pulse signal produced by a clock pulse source 20 calculate the actual speed relative to the water. The signal selected by the selector circuit 17 is fed to a presentation display circuit 19 provided with a three digit display.

Since the equipment is modularly built and can be supplemented little by little, it may also be desirable for the output signals from the water unit to also be fed to the display circuit 13. This is made possible by the selector circuit 17 being in communication via the connection 21, indicated by a dotted line, with a switch 22 situated at the input of the display circuit 13.

The display circuit 19 can also be fed from a selector circuit 23 through a switch 24 at the input of the display circuit 19 being put in its second position. The selector circuit 23 is connected to the output signal of the clock pulse generator 20 and to the output signal stored in a calculation unit 25 from an optional echo-sounder.

The signals from the compass and the bearing indicator are fed respectively to calculation units 26 and 27, the output signals from which are connected to a selector circuit 28. The signal selected by the selector circuit 28 is further fed to a third display circuit 29, this also being provided with a three digit display.

For choosing among the parameters there are three switches 30,31,32 each one arranged to select a parameter fed to the display units 13,19,29, respectively. This is accomplished by the switches being connected to an interface circuit 33 feeding parameter selecting signals dependent on the switch position to the selector circuits 12,17,23 and 28. The signals corresponding to the respective chosen parameters are fed from the selector circuits to the associated display circuits, the switch 24 selecting, as has already been mentioned, either of the signals from the selector circuits 17 and 23 for feeding further to display 19. In a similar manner the switch 22 makes it possible for the display circuit 13 to be supplied with the signal either from the selector circuit 12 or some other signal which is desired to be displayed and which is applied to the auxiliary input 46. A second auxiliary input 47 can be connected to the display unit 29 via a switch 48.

The system uses time multiplex which is accomplished by means of a display control unit 34 which selects a time interval for the display of each digit in each of the three display circuits 13,19,29, control of these circuits being performed over a line 35 and control of the selector circuits over a line 36. Through the time division it is possible to use a common unit for converting the signals in the selector circuits to a suitable form for digital presentation display for each of the circuits 13,19 and 29.

The value of the selected parameter from each selection circuit is also fed from the respective selector circuits directly to the interface unit 33, which on its two outputs 37,38 sends signals identifying the selected parameter and the value of this parameter. Both these outputs can be connected to a mini computer which can be used for certain calculations and even for the installation of an auto pilot.

The system enables connection of alarm circuits for sending an alarm when a certain pre-set limiting value for any parameter is exceeded. There is thus provided a limit setting means 39 in which the desired wind angle limit can be set, its output connected to a supervisory wind angle watch circuit 40 which compares the set limit with the actual wind angle in unit 10. When the set limit is exceeded, an alarm is given by an alarm circuit 41 in the form of an audible and/or visual signal.

In a similar manner there is a limit setting means 42 feeding a supervisory time/distance watch circuit 43. This circuit can be supplied with a signal from either the distance unit 16 or the clockpulse source 20 in accordance with the position of a switch 44, the alarm circuit 45 fed by the watch circuit 43 giving an alarm when a certain distance has been travelled, or at a desired time interval.

Both the limit setting means 39 and 42 are preferably thumb wheel switches. The alarm circuits 41 and 45 can give audible and/or visual alarm and can be completely or partly common.

It should be noticed that with the system carried out according to the invention, parameter information is always available in the associated circuits 10,11,15,16,20,25,26 and 27 so that the selector circuits can immediately and at any time choose the desired information for transmission to the display circuitry. By a simple modification of the circuit arrangement shown, and by the use of multiplex procedure, conversion to a suitable form for digital display of the selected parameters in all the selector circuits 12,17,23,28 can take place in a single code converter 34. Compared with the embodiment shown where each display circuit 13,19 and 29 must be provided with a code converter (although each such converter is common for all the digits in each circuit) a further economy is achieved.

In FIGS. 3a and 3b two discs 1 and 2 are shown mounted on a shaft 3. The shaft can rotate freely in relation to the discs thus being, for example, achieved by having ball bearings placed between the shaft and the respective disc. Thus the disc 1, the disc 2 and the shaft 3 can all rotate independently of each other and at different speeds.

If switches 4 and 5, respectively, are each attached to a respective disc and an arm 6 is attached to the shaft in a manner indicated in FIG. 3b, then these switches will be actuated (opened or closed) each time the arm passes each switch.

The discs 1 and 2 may be assumed to be stationary but rotated so that the switches are angularly displaced from each other. Both switch 4 and switch 5 will then be actuated once per revolution by the shaft 3, the switch actuating frequency being directly proportional to the shaft rotation speed, the time displacement between actuating the switches being dependent on the angular displacement of the disc 2 in relation to the disc 1. Actuation of the switches occurs simultaneously when the switches are exactly opposite each other.

If a wind vane is attached to the disc 2 and anemometer cups to the shaft 3, the apparatus can be used for measuring both wind direction and wind speed. The number of switch actuations per time unit will then be a function of the wind speed, and the time difference between the actuations of the switch 4 and the switch 5 will be a measurement of the wind direction relative to a straight line through the center of the shaft and the switch 4.

It is obvious that this apparatus is subject to many variations from the embodiment of FIG. 3, especially with respect to the arm 6 and the switches 4,5. There are a number of practical ways to effect the above-mentioned switch actuation, and some of these will be described below while referring to FIGS. 4–7.

FIG. 4 shows an embodiment similar to the one just described. Instead of the arm 6, a permanent magnet 7 is rigidly mounted on the shaft, the magnet actuating reed elements switches 4' and 5', respectively, attached to each of the discs. As is well known, these reed switches close when they are exposed to a magnetic field having a suitable direction. The permanent magnet 7 thus causes closure of the switches when it passes directly over or under the respective reed element switches 4', 5' during rotation of the shaft.

In FIG. 5 the reed switches have been replaced by a total of four induction coils, two coils mounted on each disc. The coils 8,9 and 10, 11, respectively, of each disc are series-connected in such a way that they coact with each other.

In FIGS. 6 and 7 two different ways of using electro-optical couplings are shown. The apparatus shown in FIG. 6 utilizes light emitting diodes (L.E.D.) 13', 13'' and photo transistors 14', 14'' forming a so-called optical fork attached to each disc. An arm 12 attached to shaft 3 passes between the L.E.D. and each photo transistor during rotation of the respective arm, the transistor thereby being turned off. The L.E.D. preferably emits rays in the UV spectrum and is of the gallium arsenide type. Other photoelements may also be used instead of photo transistors, e.g., photo diodes.

In the embodiment of FIG. 7 the photo transistors 14', 14'' are, as in FIG. 6, rigidly attached to the respective discs while L.E.D.s 15', 15'' are mounted on an arm 16 rotating with the shaft 3. The photo transistors will thus receive one light pulse for every revolution of shaft 3. The arm 16 can be provided with a counterweight 17 to balance it.

The electrical connections between the different elements in FIGS. 4–7 are not shown. The simplest and most obvious method is to use slip rings and to utilize the possibility offered by the shaft.

FIG. 8 shows in perspective and partly in section the embodiment of FIG. 4 used for measuring wind speed and wind direction. The upper disc has been constructed in the form of a beaker 2', 2'' connected to a wind vane 18 and able to turn freely with it. The lower disc 1 is fixed by attachment means 19. The rim of the beaker rests against balls 20 placed in the disc 1. The shaft 3 rotates freely together with anemometer cups 21. The lower reed switch element 4' and the permanent magnet 7 rotates with the shaft 3.

In this construction, electrical connection is facilitated if the walls 2'' of the beaker are made from conductive material while the top disc 2' is non-conductive, since the walls 2' and the balls 20 can then form the one conductor while the shaft 3 forms the other one. In this case no slip rings are required, the friction attendant with them thus not being present.

All the described embodiments, when they are used for wind measurement similary to the embodiment of FIG. 8, send two pulse trains having the same repetitive frequency but mutually displaced in time according to the direction of the striking wind. Both these pulse trains are shown in FIG. 9 where T designates the time between two consecutive pulses in one pulse train and $t$ the mutual time displacement between the two pulse trains.

In wind measurement, $1/T$ is a measurement of the wind speed and $t/T$ a magnitude defining the wind direction.

The measuring apparatus described can also be used in the above-mentioned speed transducer.

What I claim is:

1. A shipboard navigational information system comprising
    a plurality of transducing means for sensing navigational parameters and creating an electrical signal dependant on the parameters, there being transducing means to sense at least wind velocity, wind direction and water velocity relative to the ship,
    a calculation unit connected to each of said transducing means to convert the output of the transducing means to a digital signal,
    at least two selector circuits each receiving input from two of the calculation units and each selecting and storing the output of one of the calculation units,
    at least one display circuit receiving input from the selector circuits, and
    display control circuit means using time multiplexing to control the operation of the display circuits and the selector circuits to display information corresponding to the navigational parameter selected by the operator.

2. A shipboard navigational information system as claimed in claim 1 wherein a plurality of manually operable switches are connected to the selector circuits for the outputs of which calculation units are selected and stored by the selector circuits.

3. A shipboard navigational information system as claimed in claim 1 wherein there is an operator preselectable limit set means and a supervisory watch circuit associated with one of said calculation circuits and there is an alarm connected to the supervisory watch circuit so that if the preselected limit on the limit set means is exceeded by the signal in the calculation circuit, the alarm is actuated.

4. A shipboard navigational information system as claimed in claim 1, wherein there is a clockpulse source, and also a distance calculation circuit receiving input from the clockpulse source and the tranducing means sensing water velocity to calculate distance information.

5. A shipboard navigational information system as claimed in claim 1 wherein there are transducing means for sensing compass and bearing information.

6. A shipboard navigational information system as claimed in claim 1 wherein the combined transducing means for sensing wind direction and wind velocity includes a shaft, a pair of independently rotatable bodies on said shaft, an electric pulse generator on each of said bodies and means secured to said shaft for causing the pulse generators to create electric pulses as said shaft rotates relative to said bodies.

7. A shipboard navigational information system as claimed in claim 6 wherein one of said bodies is rigidly attached to a wind vane, one of said bodies is rigidly secured to a supporting mounting and the shaft carries anemometer cups thereon.

* * * * *